United States Patent [19]
Hsieh

[11] Patent Number: 5,977,537
[45] Date of Patent: Nov. 2, 1999

[54] COLOR IDENTIFYING DEVICE

[75] Inventor: Yuan-Tai Hsieh, Yung Kang, Taiwan

[73] Assignee: I-Chun Chen, Tainan Hsien, Taiwan

[21] Appl. No.: 09/040,938

[22] Filed: Mar. 18, 1998

[51] Int. Cl.[6] ........................................................ G01J 3/50
[52] U.S. Cl. ............................................ 250/226; 250/216
[58] Field of Search .................................. 250/226, 214.1,
250/216, 208.1; 358/513, 514; 382/162,
167; 257/440; 356/405, 406

[56] References Cited

U.S. PATENT DOCUMENTS 4,653,014  3/1987  Mikami et al. ........................... 250/226

*Primary Examiner*—Que T. Le
*Attorney, Agent, or Firm*—Rosenberg, Klein & Bilker

[57] ABSTRACT

A color identifying device includes an emitter for supplying light to throw on a tested object, an amorphous photosensor, an amplifier, an ADC and a microprocessor. The emitter is formed with a LED producing three original colors or with three separate LED producing separate colors of red, green and blue. The photosensor receives the reflected light from the object and sends signals of three colors to the amplifier which amplifies the signals and sends them to the ADC. Then the ADC converts the analog signals into digital signals to be sent to the microprocessor which calculates the digital signals by a program identifying the colors of the object accurately.

2 Claims, 2 Drawing Sheets

COLOR IDENTIFYING DEVICE

BACKGROUND OF THE INVENTION

This invention is a novel color identifying device which is provided with an ideal emitter to supply a stable light source. Its emission is very similar to sunlight.

In FIG. 1, the color identifying device includes an emitter 1, an amorphous photosensor 2, an amplifier 3, an analog digital converter (ADC) 4 and a microprocessor 5. The emitter 1 supplies the sun-like light to a testing object 6, and the amorphous photosensor 2 receives the reflected light. The signal generated from the photosensor 2 are amplified and converted by the amplifier 3 and ADC 4, respectively. Finally, the digital signal are calculated to indentify the color of the tested object 6 by the microprocessor 5.

For common sensors, such as heat sensitive resistors, light sensitive resistors, infrared sensors, etc., the survey of physical volume is depended on object or environment. Object tested by amorphous photosensors 2 does not emit light itself and the emitter 1 has to be used for supplying a background light source. This light source must meet very rigorous conditions described as follows.

1. A background light source should not heat that the temperature effect affects the testing result of sensor. Besides, if the light source has the heating phenomenon in evidence, it implies that the light source consumes much energy, having bad influence on a portable device.

2. The light source must be stable and never glitter. If the light source is unstable, light reflected by an object changes so that it is difficult to sample.

3. Light must be very similar to sunlight, because sunlight contains various visible light to reveal the true colors of object. If a light source trends to some visible light (for example, a tungstem bulb trends to yellow light), it is impossible to identify the true colors of object.

However, emitters 1 used nowadays in color identifying devices, such as luminescent lamps and tungsten bulbs, cannot satisfy the three fundamental conditions described above.

SUMMARY OF THE INVENTION

This invention is a novel color identifing device, which includes an emitter, an amorphous photosensor, an amplifier, an ADC, and a microprocessor. The emitter emits light to throw on a tested object. The amorphous photosensor receives the reflected light from the object and sends out singals of the red, green and blue reflecting lights to the amplifier. The amplifier magnifies the signals to the ADC which converts the analog signals into digital signals. Then the digital signals are sent to the microprocessor which calculates the signals by a program and identifies the colors of object. Its characteristics is that the emitter is a mixed unit of three original color LEDs (red, green and blue). A concave lens is disposed in a housing transparent to let lights pass through, so that the three light emitted by the three LEDs may be dispersed and mixed together to supply visible light similar to sunlight.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
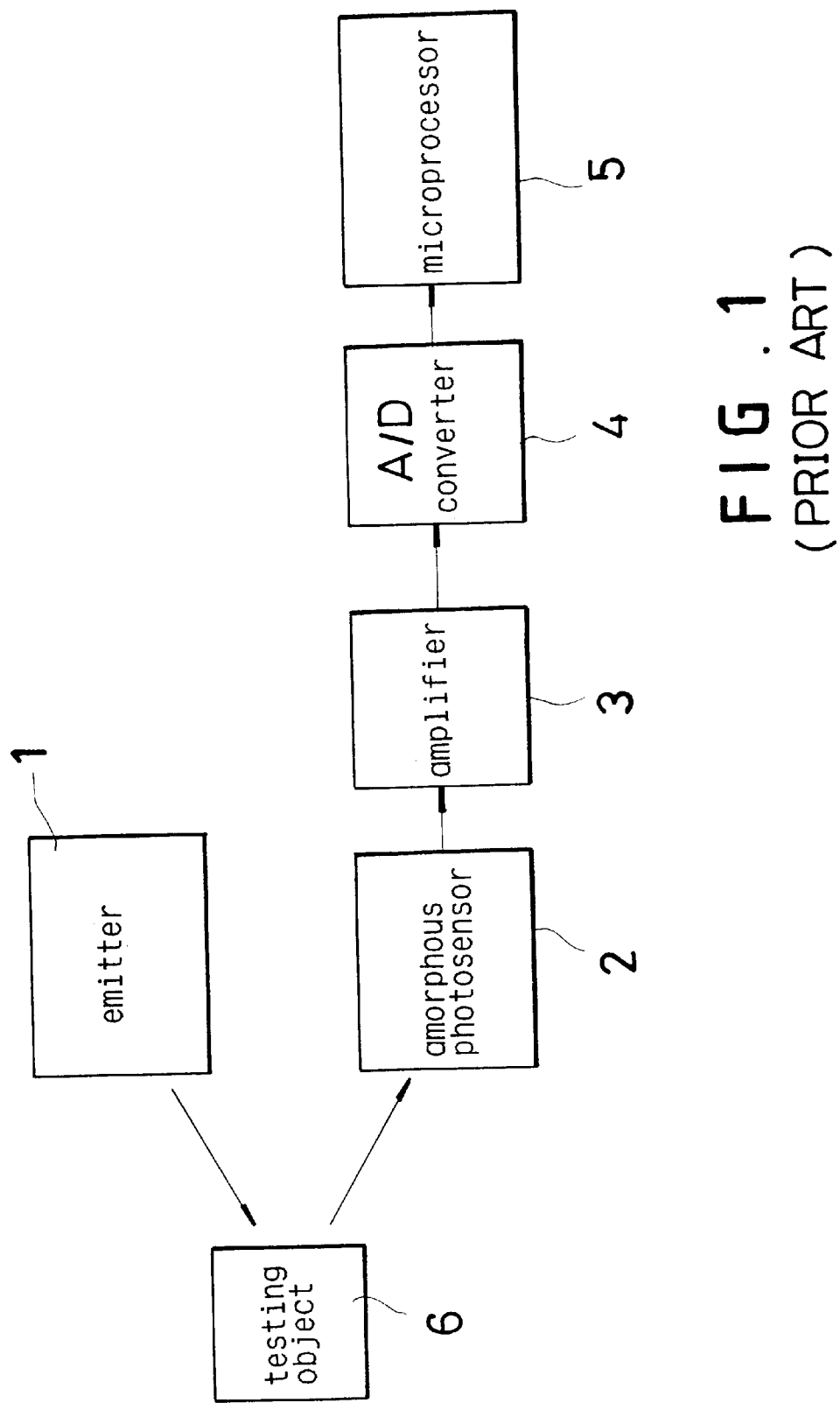
FIG. 1 is a block diagram of a conventional color identifying device.

First, a preferred embodiment of a color identifying device, as shown in FIG. 1, includes an emitter 1, an amorphous photosensor 2, an amplifier 3, an ADC (analog digital converter) 4 and a microprocessor as main components combined together.

The emitter 1 supplies light to throw on a tested object 6.

The amorphous photosensor 2 receives the reflected light from the object 6 and sends out signals of the three color lights (red, green and blue) to the amplifier 3 as every light can be decomposed into these original colors. The amplifier 3 amplifies the signals coming from the amorphous photosensor 2 and sends them to the ADC 4 which converts the analog signals into digital signals. Then the digital singals are sent to the microprocessor 5. The microprocessor 5 calculates the signals by a preset program (such as program can deciding the proportion of original colors) to perform the identifying action of the object 6.

After having carried experiment with the invention, the inventor has found that an emitter containing an three original color mixed LED (red, green and blue) is the most ideal for the color identifying device, producing no heat by all means. Never glittering and stable, and emitting the three original color mixed visible light similar to sunlight.

Figure 2:
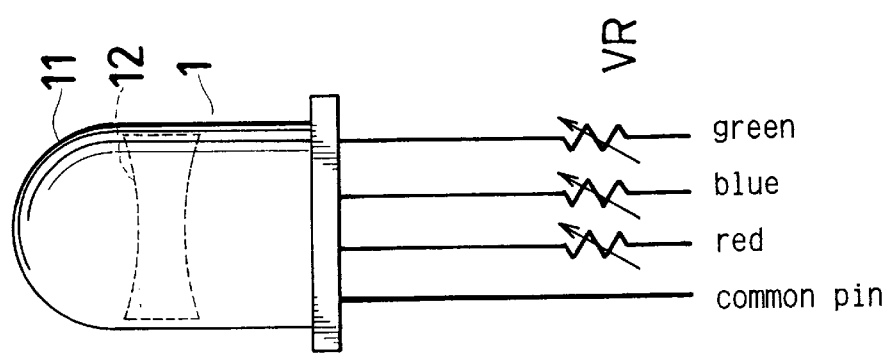
FIG. 2 is a front view of an emitter in a first embodiment of a color identifying device of the present invention; and, FIG. 3 is a front view of a emitter in a second embodiment of a color identifying device of the present invention.

As shown in FIG. 2, the first embodiment of the emitter 1 used in the present invention is a single combined LED emitting the three original colors of red, green and blue. Then a concave lens 12 is provided in a housing 11 of the emitter 1 for dispersing and mixing the three original colors into visible light very similar to sunlight.

Figure 3:
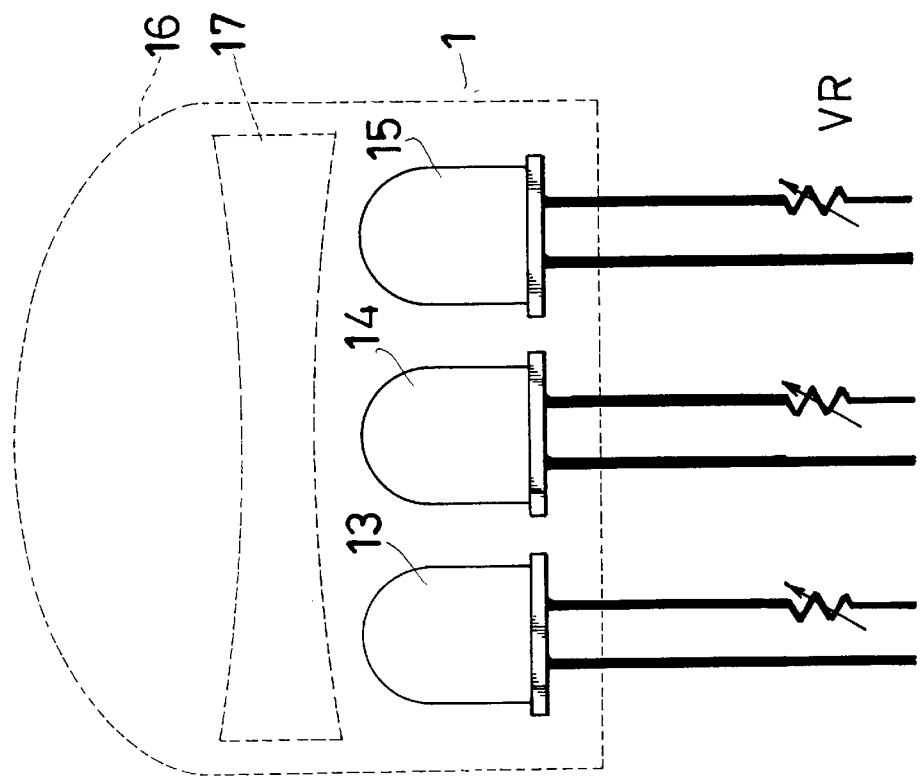

A second embodiment of an emitter 1 used in the present invention shown in FIG. 3, consists of three separate LEDs contained in a housing 16. The three LEDs are a red LED 13, a green LED 14 and a blue LED 15. Then a concave lens 17 is disposed in the housing 16 for dispersing and mixing the red, green and blue light emitted by the three LEDs 13, 14 and 15 as visible light very similar to sunlight. In addition, a variable resistor (VR) may be connected with a pin of LED 13, 14, 15 to produce ideal light by adjusting the VR.

As can be understood from the aforesaid descriptioin, the LED unit combined with three original colors as an emitter has the following advantages.

1. It never produces heat, preventing the influence on tests of a photosensor.

2. Its light source is stable, never glittering, increasing accuracy of identifying colors.

3. The light produced by it is visible and quite similar to sunlight, revealing the true colors of object tested, increasing accuracy of identifying colors.

4. It is low power and small dimension, suitable for making a portable color identifying device.

5. Its cost is cheap and easy for sale.

While the preferred embodiment of the invention have been described above, it will be recognized and understood that various modifications may be made therein and the appended claims are intended to cover all such modifications which may fall within the spirit and scope of the invention.

What is claimed is:

1. A color identifying device comprising an emitter, an amorphous photosensor, an amplifier, an ADC (analog digital converter), and a microprocessor;

said emitter supplying light on a tested object;

said amorphous photosensor receiving the reflecting light from the object and providing signals of red, green and blue color contained in the reflected light to said amplifier;

said amplifier amplifying the signals of the reflected light and providing output signals to said ADC;

said ADC receiving the analog signals coming from said amplifier and converting the analog signals into digital signals and providing said digital signals to said microprocessor;

said microprocessor performing calculation of the digital signals coming from said ADC by a program and identifying colors of said object;

characterized in that said emitter including a single combined LED producing light of three original colors, red, green and blue, a housing provided to contain said emitter, a concave lens provided in said housing for dispersing and mixing the three original colors produced by said LED of said emitter, so as to supply a visible light very similar to sunlight to be provided on said tested object.

2. The color identifying device as claimed in claim 1, wherein said emitter is formed with three separate LEDs of red, green and blue colors, said housing is provided to contain said emitter, and a concave lens is provided in said housing for dispersing and mixing the light of the three colors produced by said emitter for acquiring a visible light very similar to sunlight.

* * * * *